US012798138B2

(12) United States Patent
Doppenberg

(10) Patent No.: US 12,798,138 B2
(45) Date of Patent: Nov. 17, 2026

(54) APPARATUS AND METHOD FOR CONVERTING A SHEET INTO A CONTINUOUS STRIP

(71) Applicant: VMI Holland B.V., Epe (NL)

(72) Inventor: Evert Doppenberg, Epe (NL)

(73) Assignee: VMI HOLLAND B.V., Epe (NL)

( * ) Notice: Subject to any disclaimer, the term of this patent is extended or adjusted under 35 U.S.C. 154(b) by 0 days.

(21) Appl. No.: 18/858,231

(22) PCT Filed: Apr. 12, 2023

(86) PCT No.: PCT/NL2023/050189
§ 371 (c)(1),
(2) Date: Oct. 18, 2024

(87) PCT Pub. No.: WO2023/224467
PCT Pub. Date: Nov. 23, 2023

(65) Prior Publication Data

US 2025/0269549 A1 Aug. 28, 2025

(30) Foreign Application Priority Data

May 18, 2022 (NL) ..................................... 2031908

(51) Int. Cl.
*B26D 1/18* (2006.01)
*B26D 1/06* (2006.01)
(Continued)

(52) U.S. Cl.
CPC ............... *B26D 1/185* (2013.01); *B26D 1/06* (2013.01); *B26D 3/003* (2013.01); *B26D 7/14* (2013.01); *B29C 48/2888* (2019.02)

(58) Field of Classification Search
CPC .......... B26D 1/185; B26D 1/06; B26D 3/003; B26D 7/14; B26D 5/20; B26D 1/565;
(Continued)

(56) References Cited

U.S. PATENT DOCUMENTS 3,180,190 A * 4/1965 Haselow ................ B65H 29/62 83/155.1
3,685,756 A * 8/1972 Marx ........................ C14B 5/04 242/546

(Continued)

FOREIGN PATENT DOCUMENTS

CN 216376798 U 4/2002
DE 102004000034 A1 4/2006

(Continued)

OTHER PUBLICATIONS

WO_2019088825_A1 (Year: 2019).*

(Continued)

*Primary Examiner* — Jonathan G Riley
(74) *Attorney, Agent, or Firm* — HAYES SOLOWAY P.C.

(57) ABSTRACT

Disclosed are an apparatus and a method for converting a sheet of elastomeric material into a continuous strip, wherein the apparatus includes a cutting section for providing a sequence of cuts in the sheet along which the sheet is separable into interconnected zig-zag sections to form the continuous strip, wherein the apparatus further includes an infeed section for feeding the sheet to the cutting section in a feeding direction along a feeding path, wherein the infeed section includes a first infeed member for feeding the sheet along the feeding path at a first infeed rate, and a second infeed member downstream of the first infeed member for feeding the sheet along the feeding path at a second infeed rate, wherein the apparatus is operable in a stretching mode in which the second infeed rate is higher than the first infeed rate.

39 Claims, 7 Drawing Sheets

(51) Int. Cl.
*B26D 3/00* (2006.01)
*B26D 7/14* (2006.01)
*B29C 48/285* (2019.01)

(58) Field of Classification Search
CPC . B26D 3/02; B26D 3/00; B26D 7/015; B26D 7/08; B26D 7/27; B26D 5/007; B26D 5/00; B29C 48/2888; B65H 2301/4216; B65H 2404/256; B65H 2404/261; B29D 29/00
See application file for complete search history.

(56) References Cited

U.S. PATENT DOCUMENTS

| | | | | | |
|---|---|---|---|---|---|
| 3,712,773 | A * | 1/1973 | Baumgarten | B29C 48/2888 | 83/61 |
| 3,902,954 | A * | 9/1975 | Lotto | B29C 65/305 | 83/156 |
| 3,968,710 | A * | 7/1976 | Gros | B26D 3/168 | 83/18 |
| 4,060,015 | A * | 11/1977 | Gros | B26D 1/185 | 83/42 |
| 4,688,455 | A * | 8/1987 | Takehara | B26D 1/565 | 83/424 |
| 4,691,606 | A * | 9/1987 | Johnson | B26D 7/14 | 83/660 |
| 4,817,483 | A | 4/1989 | Armbruster | | |
| 7,811,399 | B2 * | 10/2010 | Lammlein, Jr. | B26D 7/14 | 156/123 |
| 2003/0108633 | A1 | 6/2003 | Yamakawa et al. | | |
| 2013/0298431 | A1 | 11/2013 | Hiraoka et al. | | |
| 2019/0001653 | A1 | 1/2019 | Gilbert et al. | | |
| 2019/0111578 | A1 * | 4/2019 | Mulder | B26D 7/015 | |
| 2020/0391973 | A1 * | 12/2020 | Mulder | B26D 5/007 | |

FOREIGN PATENT DOCUMENTS

| | | | | | |
|---|---|---|---|---|---|
| JP | 2002059395 | A | | 2/2002 | |
| JP | 2002193515 | A | | 7/2002 | |
| JP | 2004262194 | A | | 9/2004 | |
| JP | 2005125701 | A | | 5/2005 | |
| JP | 2015039747 | A | * | 3/2015 | B65H 19/26 |
| JP | 2019-506318 | A2 | | 3/2019 | |
| JP | 2021-501700 | A2 | | 1/2021 | |
| WO | 2017171454 | A1 | | 10/2017 | |
| WO | WO-2019088825 | A1 | * | 5/2019 | B26D 1/185 |

OTHER PUBLICATIONS

JP_2015039747_A (Year: 2015).*
International Search Report and Written Opinion issued in PCT/NL2023/050189, dated Jul. 11, 2023, 9 pages.
International Preliminary Report on Patentability issued in PCT/NL2023/050189, dated Nov. 4, 2024, 7 pages.

* cited by examiner

APPARATUS AND METHOD FOR CONVERTING A SHEET INTO A CONTINUOUS STRIP

BACKGROUND

The invention relates to an apparatus and a method for converting a sheet into a continuous strip.

WO 2017/171454 A1 discloses an apparatus and a method for converting a sheet into a continuous strip, wherein the sheet has a sequence of cuts extending in a cutting direction transversely across the sheet with respect to the longitudinal direction to form a plurality of interconnected sheet sections, wherein the continuous strip has zig-zag sections, wherein the sheet sections are arranged to be pulled apart in a feeding direction to form the zig-zag sections, wherein the apparatus comprises a separator device with a retaining device for retaining an upstream sheet section with respect to a consecutive downstream sheet section in the feeding direction and a sensor device for detecting the pulling apart of the downstream sheet section from the upstream sheet section.

SUMMARY OF THE INVENTION

A disadvantage of the known apparatus is that the sheet comprises raw elastomeric material which may have irregularities in shape, size and/or thickness. In particular, the sheet may have folds or creases. Although small folds or creases can be fed through the apparatus without problems, large folds and creases, for example when the sheet is at least partially folded back onto itself, may block or clog the apparatus. When this happens, the apparatus has to be stopped to allow for manual intervention and/or manual removal of the clogging.

It is an object of the present invention to provide an apparatus and a method for converting a sheet into a continuous strip, wherein downtime of the apparatus as a result of blockage or clogging can be reduced.

According to a first aspect, the invention provides an apparatus for converting a sheet of elastomeric material into a continuous strip, wherein the apparatus comprises a cutting section for providing a sequence of cuts in the sheet along which the sheet is separable into interconnected zig-zag sections to form the continuous strip, wherein the apparatus further comprises an infeed section for feeding the sheet to the cutting section in a feeding direction along a feeding path, wherein the infeed section comprises a first infeed member for feeding the sheet along the feeding path at a first infeed rate, and a second infeed member downstream of said first infeed member for feeding the sheet along the feeding path at a second infeed rate, wherein the apparatus is operable in a stretching mode in which the second infeed rate is higher than the first infeed rate.

By providing a speed difference between the first infeed rate and the second infeed rate, the sheet can be stretched between the first infeed member and the second infeed member. The stretching can reduce, flatten or smooth out irregularities, such as folds or creases, in the sheet. Hence, the risk of blockage and/or clogging of the apparatus as a result of such irregularities can be reduced.

In one preferred embodiment the apparatus comprises a first drive for driving one of the first infeed member and the second infeed member, wherein the apparatus further comprises a transmission between the first infeed member and the second infeed member for driving the other of the first infeed member and the second infeed member in a transmission ratio in which the second infeed rate is higher than the first infeed rate. Hence, only one of the infeed members needs to be driven.

Alternatively, the apparatus comprises a first drive for driving the first infeed member, a second drive for driving the second infeed member and a control unit that is operationally connected to the first drive and the second drive to control that the second infeed rate is higher than the first infeed rate in the stretching mode. The control of both drives allows for setting and/or adjusting a variable ratio between the first infeed rate and the second infeed rate during the stretching mode, or for alternatively switching to a non-stretching mode in which the infeed rates are equal.

In another embodiment the first infeed member comprises a first driven roll and a first drive for rotating the first driven roll, wherein the apparatus comprises a control unit that is operationally connected to the first drive to rotate the first driven roll at a circumferential speed corresponding to the first infeed rate in the stretching mode. The rotation of the first driven roll can be directly or indirectly imposed onto or transferred to the sheet to move said sheet at the first infeed rate.

Preferably, the first infeed member comprises a conveyor belt for conveying the sheet along the feeding path, wherein the first driven roll is arranged for driving the conveyor belt. The first infeed member may for example be a head pulley or a tail pulley for driving said conveyor belt.

More preferably, the apparatus further comprises a pressing member for pressing the sheet on the conveyor belt in a pressing direction. The pressing can increase friction between the sheet and the conveyor belt and prevent shifting of the sheet relative to the conveyor belt. Hence, the first infeed rate can be reliably imposed onto the sheet.

More preferably, the pressing direction is vertical and wherein the pressing member is freely movable under the influence of gravity in said pressing direction. Hence, the weight of the pressing member can be used to exert a pressing force onto the sheet. In other words, no drive is necessary to drive the pressing member.

In a further embodiment the pressing member comprises a pressing roll. The pressing roll can roll over the sheet as the sheet is advanced and/or conveyed along the feeding path.

In another embodiment the second infeed member comprises a second driven roll, wherein the second driven roll is arranged to be rotated in the stretching mode at a circumferential speed corresponding to the second infeed rate. The rotation of the second driven roll can be directly or indirectly imposed onto or transferred to the sheet to move said sheet at the second infeed rate.

In another embodiment the second infeed member comprises a pair of calendering rolls that defines an ingoing nip for receiving the sheet in the feeding direction and an outgoing nip for feeding the sheet further in the feeding direction along the feeding path. The pair of calendering rolls can further flatten out and/or smoothen irregularities in the sheet prior to the sheet reaching the cutting section.

It is noted that the aspect of the pair of calendering rolls and any of the embodiments related to the said pair of calendering rolls as discussed hereafter, may also be applied independently of the apparatus, and more in particular independently of any of the aforementioned infeed rates.

In particular, in one embodiment of said pair of calendering rolls at least one calendering roll of the pair of calendering rolls is driven. Said at least one calendering roll can pull or feed the sheet further along the feeding path towards the cutting section.

In another embodiment thereof one calendering roll of the pair of calendering rolls is rotatable about a first roll axis and is movable towards and away from the other calendering roll of the pair of calendering rolls in a calendering direction perpendicular to the first roll axis. By moving said one calendering roll towards the other calendering roll, the pair of calendering rolls can be brought into a position for calendering the sheet. More in particular, the distance between the pair of calendering rolls can be adjusted and/or the pressure exerted by the pair of calendering rolls onto the sheet can be controlled. By moving said one calendering roll away from the other calendering roll, the aperture between the pair of calendering rolls can be opened up to allow for removal or insertion of the sheet, for example at start-up of the apparatus, or for maintenance.

Preferably, the apparatus comprises an actuator for pressing said one calendering roll in the calendering direction towards the other calendering roll. The actuator may for example be used to exert a predetermined, variable or constant pressure force onto the sheet.

More preferably, the actuator is further arranged for moving said one calendering roll away from the other calendering roll. The actuator may for example be bi-directional. Once said one calendering roll has been moved away, the pair of calendering rolls is accessible for removing or inserting the sheet.

In a further embodiment the pair of calendering rolls comprises a first calendering roll with a plurality of first discs positioned coaxially to and rotatable about a first roll axis, wherein the second infeed member comprises one or more first guide bodies interposed between the plurality of first discs in an axial direction parallel to said first roll axis, wherein the one or more first guide bodies protrude into a guide area downstream of the outgoing nip of the pair of calendering rolls. The sheet comprises raw elastomeric material which tends to stick to the circumference of the first calendering roll when exiting the pair of calendering rolls at the outgoing nip. By providing the one or more first guide bodies in the area of said outgoing nip, it can be prevented that the sheet is pulled along the circumference of the first calendering roll. The one or more first guide bodies can force the sheet to keep following the feeding path. In particular, the one or more first guide bodies can act as scrapers scraping of the sheet from the circumference of the first calendering roll at said outgoing nip.

In one embodiment thereof the one or more first guide bodies protrude beyond the plurality of first discs into a square area containing a quadrant of the plurality of first discs, wherein said square area extends up to the feeding path and is located downstream of the first roll axis. It is within said square area that the sheet runs the risk of being pulled along with the circumference of the first calendering roll. Hence, by providing the one or more first guide bodies in said square area, said pulling along can be prevented.

In another embodiment thereof each first guide body of the one or more first guide bodies is provided with a first guide surface for guiding the sheet along the feeding path downstream of the first calendering roll. The first guide surface can be arranged to guide the sheet through direct contact with said sheet.

Preferably, the first guide surface diverges from the feeding path considered in the feeding direction. The purpose of the first guide surface is to loosely guide the sheet along the feeding path. It is not intended that the first guide surface tightly clamps or presses against the sheet. In particular, unnecessary friction between the first guide surface and the sheet should be prevented. Therefore, by arranging the first guide surface in an orientation diverging from the feeding path in the feeding direction, the first guide surface can be opened up or widened with respect to the feeding path instead of restricting the freedom of movement of sheet with respect to the feeding path.

In another embodiment the one or more first guide bodies comprises a plurality of first guide bodies, wherein the plurality of first guide bodies are alternated with the plurality of first discs in the axial direction. Hence, the sheet can be guided along the guide path at the outgoing nip at more than one position along the first calendering roll.

In another embodiment each first disc of the plurality of first discs has a disc width in the axial direction, wherein each first guide body of the one or more first guide bodies has a guide body width in the axial direction that is smaller than the disc width. The relatively large disc width ensures that the first calendering roll can exert pressure onto the sheet more uniformly, i.e. across a greater contact surface area between the plurality of first discs and the sheet.

In another embodiment the one or more first guide bodies, at the ingoing nip, are recessed with respect to the plurality of first discs. Hence, the plurality of first discs can effectively press the sheet at the ingoing nip while contact and/or pressure between the sheet and the one or more first guide bodies can be reduced or prevented. In particular, considering that the elastomeric material of the sheet may be pushed slightly into the area between the respective first discs, the one or more first guide bodies may be sufficiently recessed to remain clear off the sheet, even when the sheet is slightly pushed into the first calendering roll.

In another embodiment the one or more first guide bodies are fixed about the first roll axis. Hence, the one or more first guide bodies can be arranged in a stationary orientation relative to the feeding path.

In another embodiment the apparatus comprises a holder for holding the first calendering roll and the one or more first guide bodies, wherein the holder is movable in a calendering direction perpendicular to the first roll axis. Hence, the first calendering roll and the one or more first guide bodies can be moved together or in unison by said holder, for example for the purpose of accessing the pair of calendering rolls for removal or insertion of the sheet, or for maintenance.

In another embodiment the pair of calendering rolls comprises a second calendering roll with a plurality of second discs positioned coaxially to and rotatable about a second roll axis parallel to the first roll axis, wherein the second infeed member comprises one or more second guide bodies interposed between the plurality of second discs in the axial direction, wherein the one or more second guide bodies protrude beyond the plurality of second discs towards the feeding path downstream of the second calendering roll. Together, the one or more first guide bodies and the one or more second guide bodies can force the sheet to keep following the feeding path from opposite sides of said feeding path.

In a further embodiment thereof each first guide body of the one or more first guide bodies is opposite to a respective second guide body of the one or more second guide bodies in a calendering direction perpendicular to the first roll axis. Hence, a set of two opposite guide bodies can effectively define a guide channel for the sheet to pass through once it exits the pair of calendering rolls.

In another embodiment thereof each first guide body of the one or more first guide bodies is provided with a first guide surface for guiding the sheet along the feeding path downstream of the pair of calendering rolls, wherein each second guide body of the one or more second guide bodies is provided with a second guide surface for guiding the sheet along the feeding path downstream of the pair of calendering rolls, wherein the first guide surface diverges from the second guide surface considered in the feeding direction. By arranging the first guide surface and the second guide surface in diverging orientations relative to each other in the feeding direction, the guide channel defined between said guide surfaces can be opened up or widened with respect to the feeding path instead of restricting the freedom of movement of sheet with respect to the feeding path.

In another embodiment, that can also be applied independently of the aforementioned infeed members and infeed rates, the apparatus further comprises an irregularity sensor for detecting irregularities in the sheet upstream of the second infeed member. The irregularity sensor may be used to detect irregularities above a predetermined threshold, for example irregularities which are likely to cause problems such as blocking or clogging, despite any measures taken downstream of the irregularity sensor. The apparatus may be stopped to allow for human intervention.

In another embodiment, that can also be applied independently of the aforementioned infeed members and infeed rates, the infeed section further comprises one or more input rollers for retaining the sheet in the apparatus, wherein the one or more input rollers are rotatable in one-way only. Hence, the one or more input rollers can retain or hold a leading end of the sheet in the apparatus, while preventing that said leading end inadvertently slips out of the apparatus in a direction opposite to the feeding direction.

Preferably, the infeed section comprises one or more swing arms for supporting the one or more input rollers relative to the feeding path and an irregularity sensor for detecting a parameter indicative of a position and/or orientation of the one or more input rollers or the one or more swing arms relative to the feeding path. The one or more swing arms allow for the one or more input rollers to be pressed onto the sheet under their own weight. When irregularities in the sheet lift up the one or more input rollers and the associated one or more swing arms, the orientation and/or positions of these parts can be used to trigger the irregularity sensor.

In another embodiment the sheet has two longitudinal edges, wherein the cuts in the sequence alternately extend from one of the longitudinal edges towards and terminate at a termination distance short of the other of the longitudinal edges to form the plurality of interconnected zig-zag sections, wherein the cutting section comprises a cutting member for cutting the sheet along a cutting line intersecting with the feeding path and an lateral edge sensor for detecting lateral positions of the longitudinal edges at a detection position upstream of the cutting line with respect to the feeding direction. The lateral positions of the longitudinal edges may vary because of the raw shape of the sheet. The lateral positions of the longitudinal edges are detected to determine where to start or end a cut of the sequence of cuts. By detecting the lateral positions of the longitudinal edges upstream of the cutting line, the start or end of a cut for future cuts to be made can already be determined prior to starting said future cuts.

In one embodiment thereof the apparatus is configured for providing the cuts in the sequence at a cutting interval, wherein the detection position is upstream of the cutting line at a detection distance from said cutting line that is equal to or greater than said cutting interval. Hence, the lateral positions of the longitudinal edges can be detected in a detection position that is relevant for the subsequent cut to be made.

In another embodiment thereof the lateral edge sensor is arranged to move with the cutting member in a cutting direction parallel to the cutting line. Specifically, the lateral edge sensor can be supported by or relatively to a carriage that also carries the cutting member. By moving the lateral edge sensor together with the cutting member, the same lateral edge sensor can be used to detect both longitudinal edges. More in particular, because the cutting member cuts into the sheet from a position outside of the sheet alongside one of its longitudinal edges, the lateral position of said one longitudinal edge can be detected simultaneously with the cutting member cutting into the sheet at said one longitudinal edge.

Preferably, the lateral edge sensor is centered with respect to the cutting member in the cutting direction. Because the lateral edge sensor is not used to control the cutting in real-time, the lateral edge sensor does not need to detect the lateral position of the longitudinal edge ahead of the cutting member in the cutting direction. Instead, the lateral positions of the longitudinal edges can be detected at the current position of the cutting member along the cutting line. Hence, only a single lateral edge sensor is required that may conveniently be centered with respect to the cutting member and may be used to detect both longitudinal edges in the same manner. Consequently, the apparatus can be less expensive and/or less complex.

In a further embodiment the apparatus further comprises a control unit that is operationally connected to the lateral edge sensor for receiving a signal indicative of an edge position of one of the longitudinal edges in the detection position, wherein the control unit is configured for associating the signal received from the lateral edge sensor during one of the cuts of the sequence of cuts with a future cut of the sequence of cuts still to be made. The signal or a value representative of said signal may for example be stored in a memory to be used later for determining the start or end of said future cut to be made. More in particular, the control unit is configured for setting the termination distance for said future cut based on the signal from the lateral edge sensor.

In another embodiment, that can also be applied independently of the aforementioned infeed members and infeed rates, the cutting section comprises a cutting member for cutting the sheet along a cutting line intersecting with the feeding path, wherein the feeding path and the cutting line, at their intersection, extend in a feeding plane that is within a range of zero to ten degrees to a vertical plane. Preferably, the feeding plane extends vertically. In the vertical or nearly vertical orientation of said feeding plane, gravity can aid the separation of the interconnected zig-zag sections into the continuous strip.

In another embodiment, that can also be applied independently of the aforementioned infeed members and infeed rates, the cutting section comprises a cutting member and an anvil that cooperate for cutting the sheet along a cutting line intersecting with the feeding path, wherein the cutting member is movable up to and into abutment with the anvil in an incision direction perpendicular to the feeding path and the cutting line, wherein the cutting section further comprises a dampener for cushioning impacts between the cutting member and the anvil in the incision direction. By cushioning or dampening the impacts, wear of the cutting member as a result of said impacts can be reduced.

In another embodiment the feeding path, between the first infeed member and the second infeed member, extends within a range of zero to thirty degrees to a vertical plane.

In said orientation, any irregularities in the sheet may be reduced under the influence of gravity.

In another embodiment the apparatus, from the first infeed member and up to the second infeed member, defines a free section of the feeding path wherein the sheet is unsupported. In other words, the sheet is allowed to extend freely between the respective infeed members. In said free section, any irregularities in the sheet may be reduced under the influence of gravity.

In another embodiment, that can also be applied independently of the aforementioned infeed members and infeed rates, the apparatus comprises an outfeed section with an outfeed opening for feeding out the continuous strip from the apparatus, wherein the outfeed section is further provided with a deflection member for deflecting the continuous strip towards the outfeed opening. When feeding a new continuous strip through the apparatus, the leading end of said new continuous strip may be in a position that is difficult to reach from outside the apparatus. The deflection member can be used to conveniently bring said leading end within reach of a human operator or a mechanical gripper at the outfeed opening.

Preferably, the deflection member comprises a manually operable lever. Said manually operable lever may be located in a safely accessible position, for example outside of the housing of the apparatus.

According to a second aspect, the invention provides a method for converting a sheet of elastomeric material into a continuous strip using the apparatus according to any one of the embodiments of the first aspect of the invention, wherein the method comprises the steps of:

- feeding the sheet along the feeding path with the first infeed member at the first infeed rate; and
- feeding the sheet along the feeding path with the second infeed member at the second infeed rate.

The method relates to the practical implementation of the apparatus according to the first aspect of the invention and thus has the same technical advantages, which will not be repeated hereafter.

In one embodiment of the method, the sheet has two longitudinal edges, wherein the cuts in the sequence alternately extend from one of the longitudinal edges towards and terminate at a termination distance short of the other of the longitudinal edges to form the plurality of interconnected zig-zag sections, wherein the cutting section comprises a cutting member for cutting the sheet along a cutting line intersecting with the feeding path, wherein the method further comprises the step of detecting lateral positions of the longitudinal edges at a detection position upstream of the cutting line with respect to the feeding direction.

Preferably, the cuts in the sequence are provided at a cutting interval, wherein the detection position is upstream of the cutting line at a detection distance from said cutting line that is equal to or greater than said cutting interval.

In further a embodiment the method further comprises the step of associating a lateral position of a longitudinal edge detected at the detection position during one of the cuts of the sequence of cuts with a future cut of the sequence of cuts still to be made.

Preferably, the method further comprises the step of setting the termination distance for said future cut based on the lateral position of the longitudinal edge associated with said future cut.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
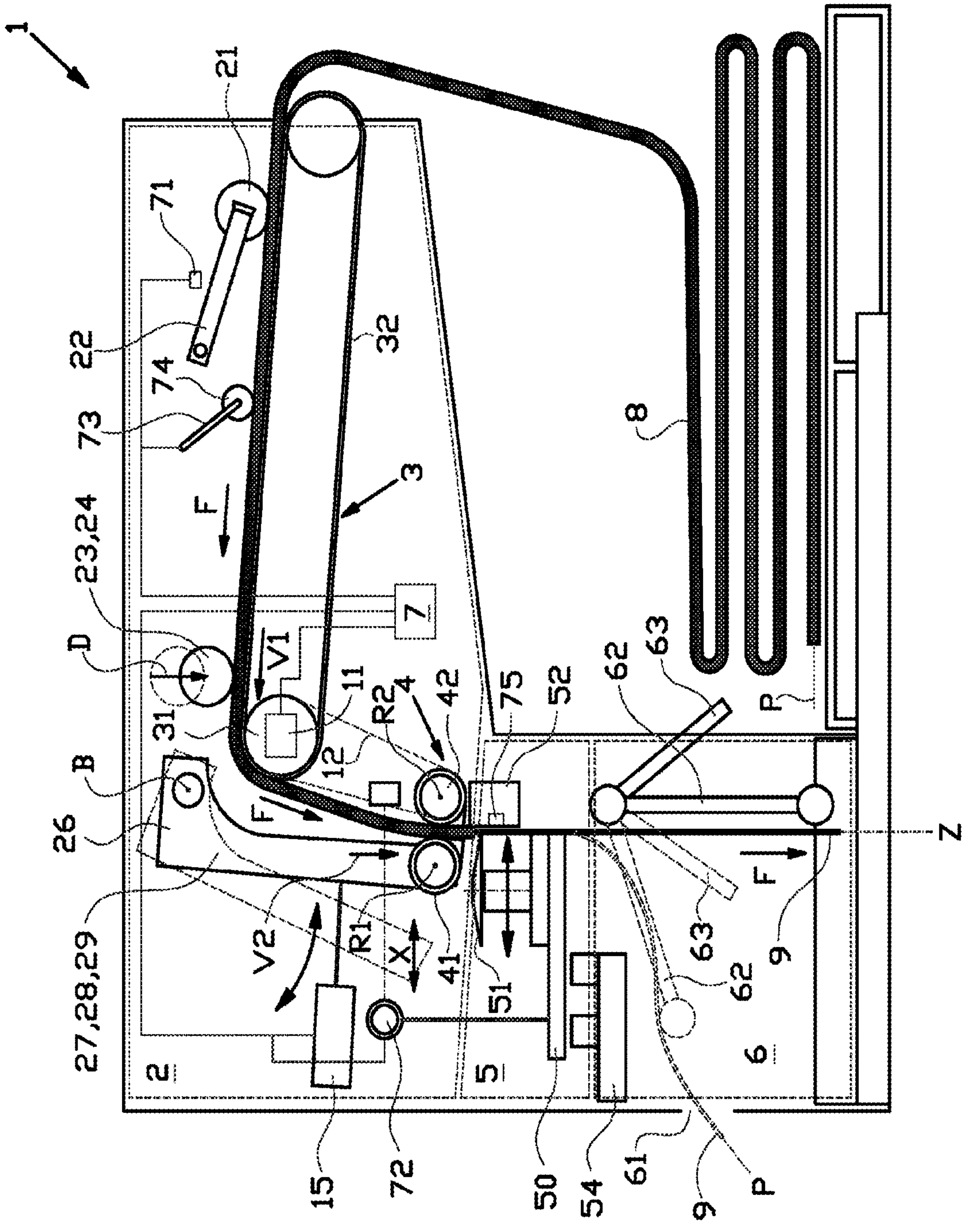
FIG. 1 shows a side view of an apparatus for converting a sheet into a continuous strip according to a first exemplary embodiment of the invention.
Figure 2:
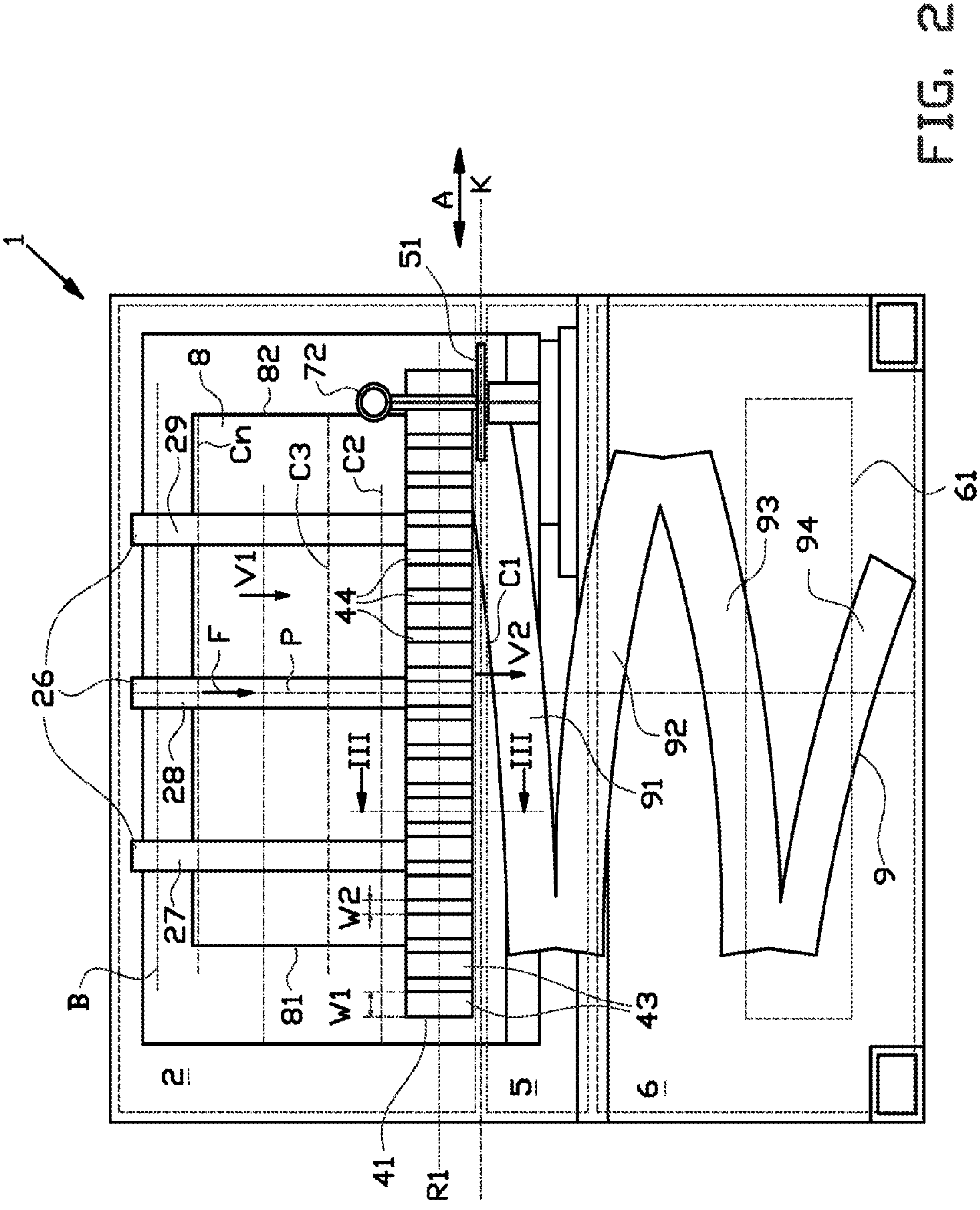
FIG. 2 shows a front view of the apparatus of FIG. 1.

FIGS. 1 and 2 show an apparatus 1 for converting a sheet 8 of elastomeric material, in particular rubber, into a continuous strip 9 according to a first exemplary embodiment of the invention. The continuous strip 9 is used as input material for an extruder. The sheet 8 is supplied to the apparatus 1 as a continuous length. It may be stacked in several layers on a pallet. The sheet 8 consists of raw material that may have irregularities and/or inconsistencies, such as folds, creases, varying thickness, irregular edges and/or varying width.

As shown in FIG. 2, the sheet 8 comprises a first longitudinal edge 81 and a second longitudinal edge 82. The apparatus 1 is provided with a cutting section 5 that is adapted, arranged and/or configured for providing a sequence of cuts C1, C2, C3, . . . , Cn in the sheet 8 along which the sheet 8 is separable into interconnected zig-zag sections 91, 92, 93, 94. In particular, the cuts C1, C2, C3, . . . , Cn in the sequence alternately extend from one of the longitudinal edges 81, 82 towards and terminate at a termination distance T short of the other of the longitudinal edges 81, 82 to form the plurality of interconnected zig-zag sections 91, 92, 93, 94.

As best seen in FIG. 1, the apparatus 1 comprises an infeed section 2 for feeding the sheet 8 to the cutting section 5 in a feeding direction F. The apparatus 1 further comprises an outfeed section 6 for feeding the continuous strip 9 out of the apparatus 1. The sheet 8 and the continuous strip 9 travel along a feeding path P, a part of which is shown in FIG. 2. If the feeding path P is not visible in the drawings, for example in FIG. 1, it is to be understood that the path travelled by the sheet 8 and the continuous strip 9 through the apparatus 1 corresponds to or coincides with the feeding path P.

As shown in FIG. 1, the infeed section 2 comprises one or more input rollers 21 for retaining the sheet 8 in the apparatus 1 when a leading end of said sheet 8 is fed into the apparatus 1. In this example, the one or more input rollers 21 are rotatable in one-way only to prevent that the sheet 8 slips back out of the apparatus 1 in a direction opposite to the feeding direction F.

In this exemplary embodiment, the infeed section 2 comprises one or more swing arms 22 for supporting the one or more input rollers 21 relative to the feeding path P. The one or more input rollers 21 are free to move under their own weight towards and rest on the sheet 8. Additionally or alternatively, the one or more input rollers 21 may be moved towards or away from the feeding path P, for example in an automated or semi-automated manner. Hence, the operator can have at least one hand free to guide the continuous strip 9 into the feeding section 2.

The infeed section further comprises a first infeed member 3 and a second infeed member 4, downstream of the first infeed member 3 with respect to the feeding direction F, for feeding the sheet 8 along the feeding path P towards the cutting section 5. The first infeed member 3 and the second infeed member 4 are spaced apart along the feeding path P. In this example, the apparatus 1, from the first infeed member 3 up to the second infeed member 4, defines a free section of the feeding path P wherein the sheet 8 is unsupported. The feeding path P, in said free section, extends under a relatively steep, downward angle to a vertical plane, in particular within a range of zero to thirty degrees.

The first infeed member 3 is adapted, arranged or configured for feeding the sheet 8 along the feeding path P at a first infeed rate V1. The second infeed member 4 is adapted, arranged or configured for feeding the sheet 8 along the feeding path P at a second infeed rate V2, different from the first infeed rate V1. The apparatus 1 is operable in stretching mode in which the second infeed rate V2 higher than the first infeed rate V1. In particular, the second infeed rate V2 is at least five percent higher than the first infeed rate V1, and preferably at least ten percent higher.

The first infeed member 3 comprises a first driven roll 31 that is adapted, arranged or configured to be driven or rotated in the stretching mode at a circumferential speed corresponding to the first infeed rate V1. The first driven roll 31 therefore imposed the first infeed rate V1 onto the sheet 8. In this example, the first driven roll 31 imposes the first infeed rate V1 onto the sheet 8 indirectly. In particular, the first infeed member 3 further comprises a conveyor belt 32 for conveying the sheet 8 along the feeding path P. The first driven roll 31 is one of the pulleys, in particular the head pulley, driving the conveyor belt 32. Hence, the first driven roll 31 can drive the conveyor belt 32 to move at the first infeed rate V1.

In this example, the load-carrying side of the conveyor belt 32 extends horizontally or substantially horizontally, i.e. within a range of zero to ten degrees to a horizontal plane.

The second infeed member 4 comprises a second driven roll 42 that is adapted, arranged or configured to be driven or rotated in the stretching mode at a circumferential speed corresponding to the second infeed rate V2. In this example, the second driven roll 42 is part of a pair of calendering rolls 41, 42. The pair of calendering rolls 41, 42 comprises a first calendering roll 41 and a second calendering roll 42. Said pair of calendering rolls 41, 42 and related aspects thereof, discussed in more detail hereafter, may be claimed independently from the apparatus 1 as a whole. As such, the second driven roll 42 may be referred to hereafter as both the 'second driven roll' and the 'second calendering roll', the latter not being limited by the word 'driven'.

As schematically shown in FIG. 1, the apparatus 1 comprises a first drive 11 for driving the first driven roll 31 and a transmission 12 between the first driven roll 31 and the second driven roll 42 for driving the second driven roll 42. The transmission 12 may be formed by a chain or a timing belt. Alternatively, gears or another suitable type of transmission may be used. The transmission 12 is configured such that a transmission ratio is obtained between the first infeed member 3 and the second infeed member 4 in which the second infeed rate V2 is higher than the first infeed rate V1. It will be understood by one skilled in the art that the first drive 11 may alternatively be configured for directly driving the second driven roll 42, in which case the transmission 12 would drive the first driven roll 11.

The apparatus 1 further comprises a control unit 7 that is operationally, electronically and/or functionally connected to the first drive 11 to control the circumferential speed of the first driven roll 31 in the stretching mode.

As further shown in FIG. 1, the apparatus 1 is provided with a pressing member 23 for pressing the sheet 8 on the conveyor belt 32 in a pressing direction D. In this example, the pressing member 23 comprises a pressing roll 24 that can roll over the sheet 8 as it is advanced underneath. Moreover, in this example, the pressing direction D is vertical or substantially vertical. The pressing member 23 is freely movable, for example in a vertical slot of the frame of the apparatus 1, under the influence of gravity in said pressing direction D. In other words, the pressing member 23 can be pressed onto the sheet 8 under its own weight. In contrast to what is shown in FIG. 1, the pressing member 23 may be positioned directly opposite to the first driven roll 31 or another roller or pulley of the infeed member 3 such that the continuous strip 9 can be pressed more reliably.

As shown in FIGS. 1 and 2, the infeed section 2 further comprises one or more infeed guides 27, 28, 29 arranged on the outside of the feeding path P where the sheet 8 is deflected downwards into the free section of said feeding path P towards the cutting section 5. As best seen in FIG. 1, the one or more infeed guides 27, 28, 29 have an arcuate inner surface that can deflect and/or guide the sheet 8 downwards if the sheet 8 itself fails to deflect downwards under its own weight. Moreover, the one or more infeed guides 27, 28, 29 can reliably restrict any unpredictable movements of the trailing end of the sheet 8 towards and/or into the cutting section 5 when said trailing end is no longer retained and/or controlled by the first infeed member 3.

As shown in FIG. 1, the first calendering roll 41 and the second calendering roll 42 are rotatable about a first roll axis R1 and a second roll axis R2, respectively. The roll axes R1, R2 are parallel or substantially parallel to each other. The first calendering roll 41 is movable towards and away from the second calendering roll 42 in a calendering direction X perpendicular to the first roll axis R1. In this example, the infeed section 2 comprises a holder 26 for holding the first calendering roll 41 relative to the second calendering roll 42. Said holder 26 is pivotable about a pivot axis B parallel to and spaced apart from the first roll axis R1 to move the first calendering roll 41 in said calendering direction X.

In this example, the aforementioned one or more infeed guides 27, 28, 29 form part of and/or are integrated with the holder 26. Hence, the infeed guides 27, 28, 29 can be moved towards and away from the feeding path P about said pivot axis B together with the first calendering roll 41.

The apparatus 1 further comprises an actuator 15 for pressing the first calendering roll 41 in the calendering direction X towards the other calendering roll 42. In this example, the actuator 15 indirectly acts on the first calendering roll 41 via the holder 26. The actuator 15 may be bi-directional, meaning that is further able for to move the first calendering roll 41 away from the second calendering roll 42, for example for removing or inserting the sheet 8 and/or for maintenance purposes.

Figure 3:
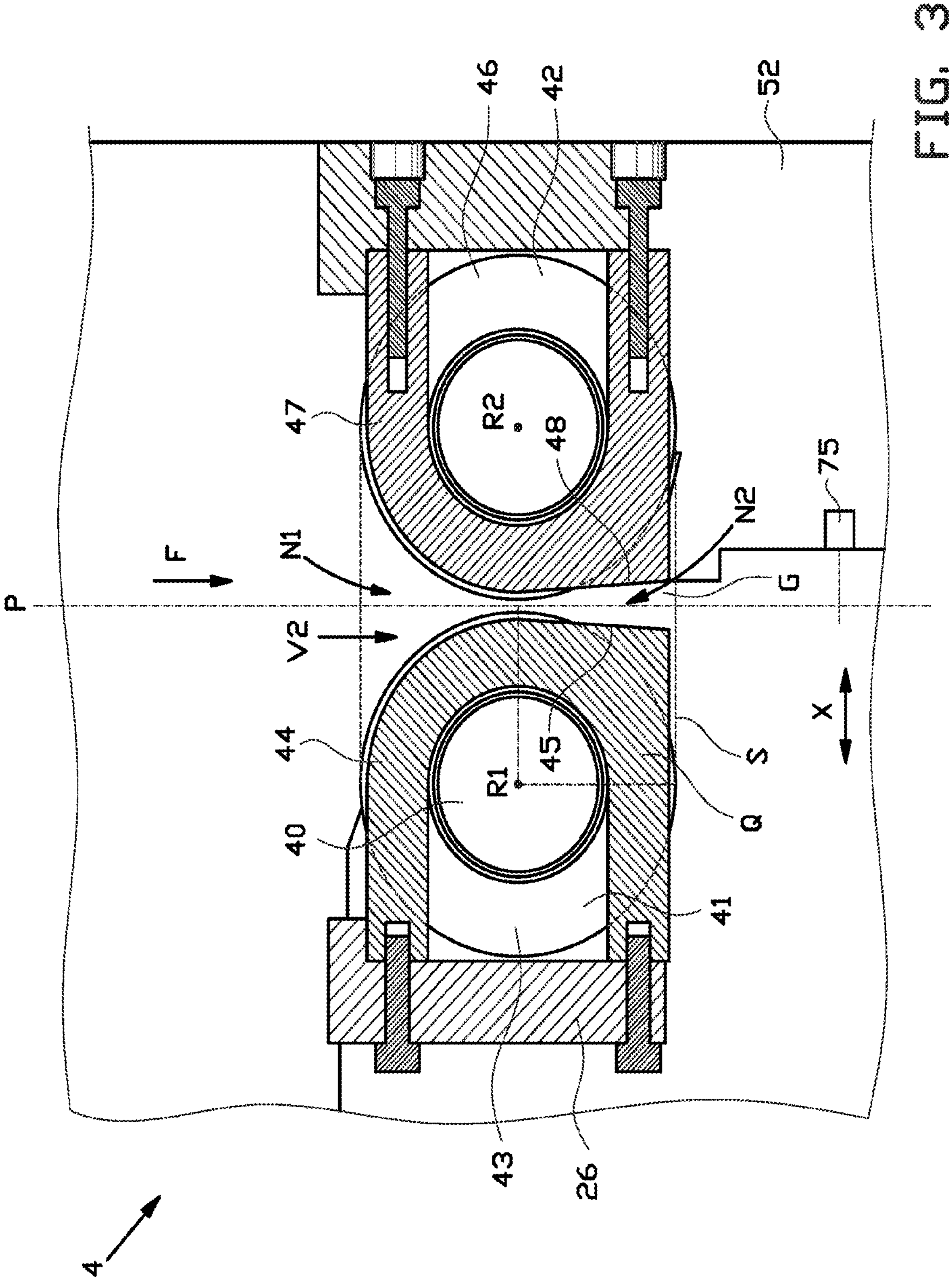
FIG. 3 shows a cross section of a pair of calendering rollers according to the line III-III in FIG. 2.
Figure 4:
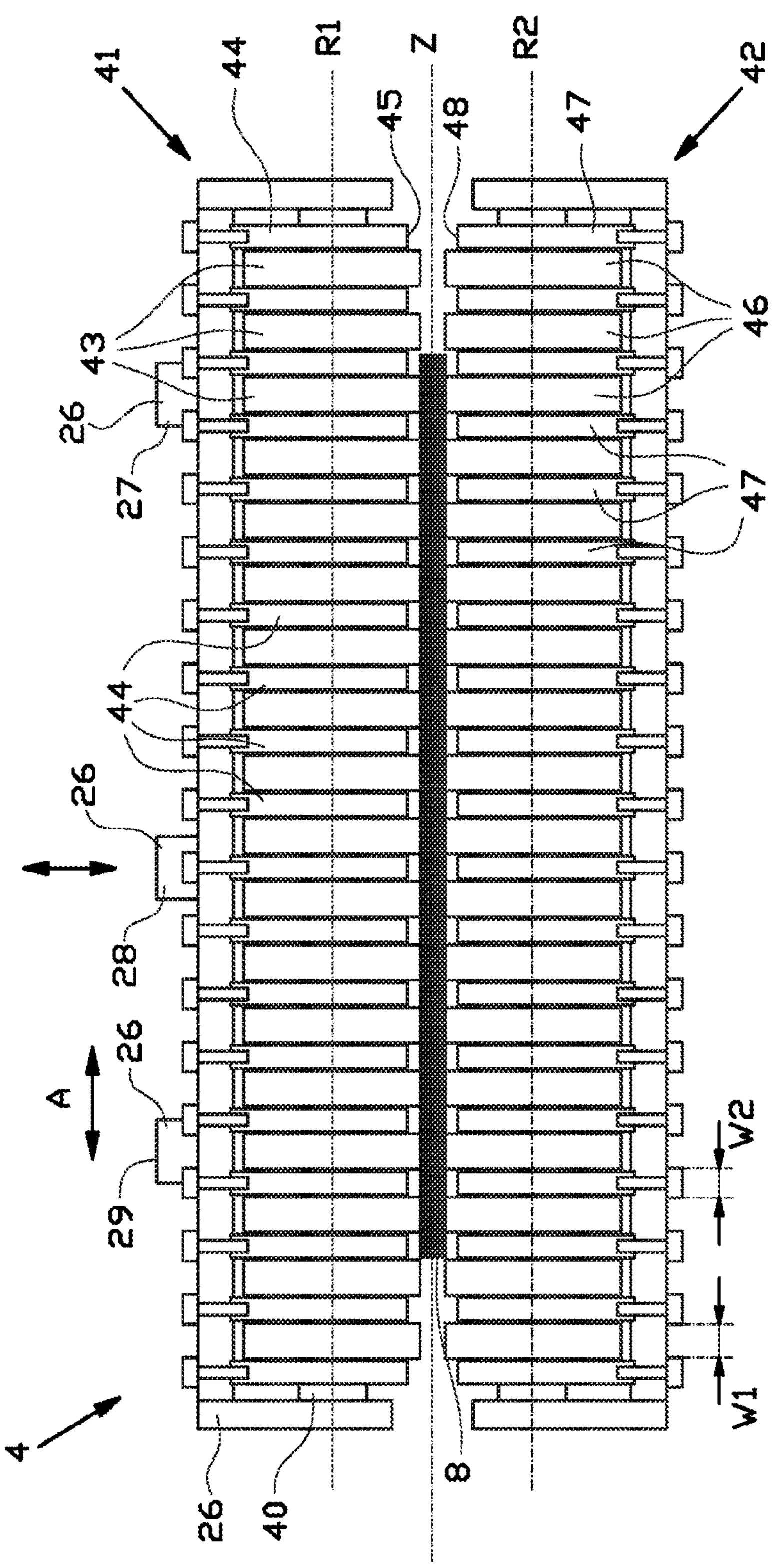
FIG. 4 shows a top view of the pair of calendering rollers according to FIG. 3.

The pair of calendering rolls 41, 42 is shown in more detail in FIGS. 3 and 4. In particular, FIG. 3 shows that the pair of calendering rolls 41, 42 defines an ingoing nip N1 for receiving the sheet 8 in the feeding direction F. The 'ingoing nip' N1 is to be interpreted as the entry point between the pair of calendering rolls 41, 42 where the pair of calendering rolls 41, 42 'bite' the sheet 8 as it is moved or pulled through said pair of calendering rolls 41, 42. The pair of calendering rolls 41, 42 further defines an outgoing nip N2 for feeding the sheet 8 further in the feeding direction F along the feeding path P. Similarly, The 'ingoing nip' N1 is to be interpreted as the exit point between the pair of calendering rolls 41, 42 where the sheet 8 exits said pair of calendering rolls 41, 42.

In this example, as shown in FIG. 3, the feeding path P extends vertically or substantially vertically, i.e. within a range of zero to ten degrees to a vertical plane, at the outgoing nip N2. In particular, a vertical or nearly vertical feeding plane Z can be defined extending through the outgoing nip N2 at said pair of calendering rolls 41, 42 in a direction parallel to the feeding direction F, the feeding path P and/or the first roll axis R1.

As best seen in FIG. 4, the first calendering roll 41 comprises a plurality of first discs 43 positioned coaxially to and rotatable about the first roll axis R1. Similarly, the second calendering roll 42 comprises a plurality of second discs 46 positioned coaxially to and rotatable about the second roll axis R2. Further, the first calendering roll 41 is provided with a plurality of first guide bodies 44 interposed between the plurality of first discs 43 in an axial direction A parallel to said first roll axis R1. Similarly, the second calendering roll 42 is provided with a plurality of second guide bodies 47 interposed between the plurality of second discs 46 in the axial direction A. In particular, the first guide bodies 44 alternate with the first discs 43 and the second guide bodies 47 alternative with the second discs 46 in the axial direction A. Note that, in this example, each first guide body 44 is located directly opposite to a respective one of the second guide bodies 47 in the calendering direction X.

The first guide bodies 44 are fixed with respect to or about the first roll axis R1. In other words, the first guide bodies 44 are arranged to remain stationary while the first discs 43 are rotated about said first roll axis R1. In particular, the first guide bodies 44 are formed as plates which are fixed to the holder 26 carrying the first calendering roll 41. In this example, the first guide bodies 44 are U-shaped such that they can be fitted over the shaft 40 of the first calendering roll 41.

Each disc 43, 46 has a disc width W1 in the axial direction A and each guide body 44, 47 has a guide body width W2 in the axial direction A that is smaller than the disc width W1. In particular, the guide body width W2 is less than eighty percent of the disc width W1, and more preferably less than sixty percent.

As shown in FIG. 3, the first guide bodies 44 protrude into a guide area G downstream of the outgoing nip N2 of the pair of calendering rolls 41, 42. The guide area G corresponds to and/or overlaps with the rest space between the calendering rolls 41, 42 directly downstream of the outgoing nip N2. By providing the first guide bodies 44 in said guide area G, it can be prevented that the sheet 8 is pulled along the circumference of the first calendering roll 41. Specifically, the first guide bodies 44 protrude beyond the plurality of first discs 43 into a square area S containing a quadrant Q of the plurality of first discs 43. Said square area S extends up to the feeding path P and/or the feeding plane Z and is located downstream of the first roll axis R1.

As further shown in FIG. 3, each first guide bodies 44 is provided with a first guide surface 45 for guiding the sheet 8 along the feeding path P downstream of the first calendering roll 41. The first guide surface 45 diverges from or is inclined away from the feeding path P considered in the feeding direction F. The first guide bodies 44, at the ingoing nip N1, are recessed with respect to the first discs 43. In particular, the first guide surface 45 has an arcuate or circular section that has a radius that is smaller than the radius of the first discs 43. Preferably, the first guide bodies 44 are recessed from the outer circumference of the first discs 43 at the ingoing nip N1 over a distance of at least one millimeter, more preferably at least two millimeters.

The second guide bodies 47 extend in a similar way into the aforementioned guide area G from the opposite side of the feeding path P and/or the feeding plane Z. Each second guide body 47 is provided with a second guide surface 48 facing towards the first guide surface 45 from an opposite side of the feeding path P and/or the feeding plane Z. The mutually facing guide surfaces 45, 48 can form or define a guide channel for the sheet 8 at the outgoing nip N2 to guide said sheet 8 further along the feeding path P. In particular, the first guide surface 45 and the second guide surface 48 diverge from each other considered in the feeding direction F. Hence, the guide channel formed between the mutually facing guide surfaces 45, 48 opens up or widens with respect to the feeding path P.

It is noted that the first guide bodies 44 and the second guide bodies 47 may be identical in shape and/or dimensions and may be exchangeable.

Figure 5A:
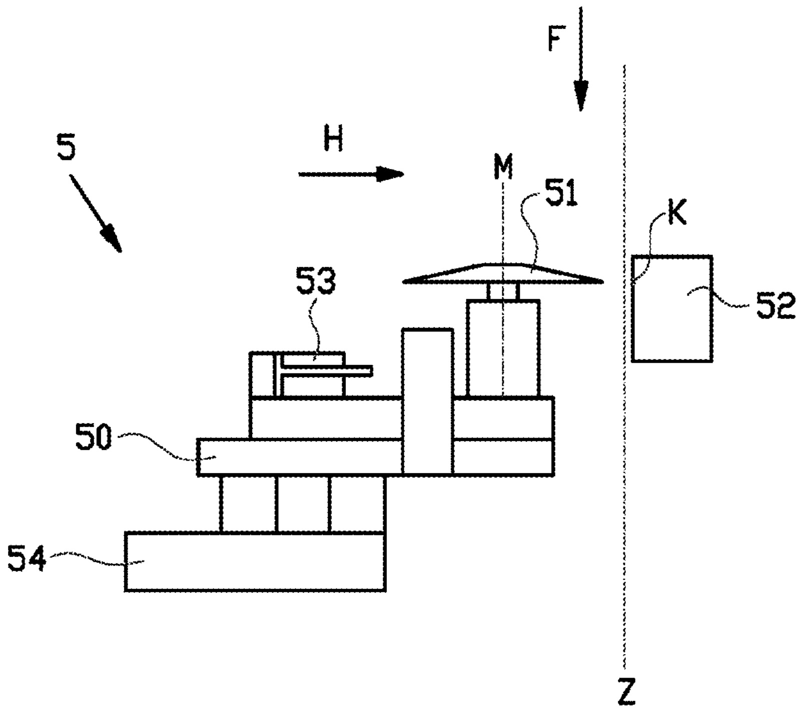
FIGS. 5A and 5B show side views of a cutting section of the apparatus according to FIG. 1.
Figure 5B:
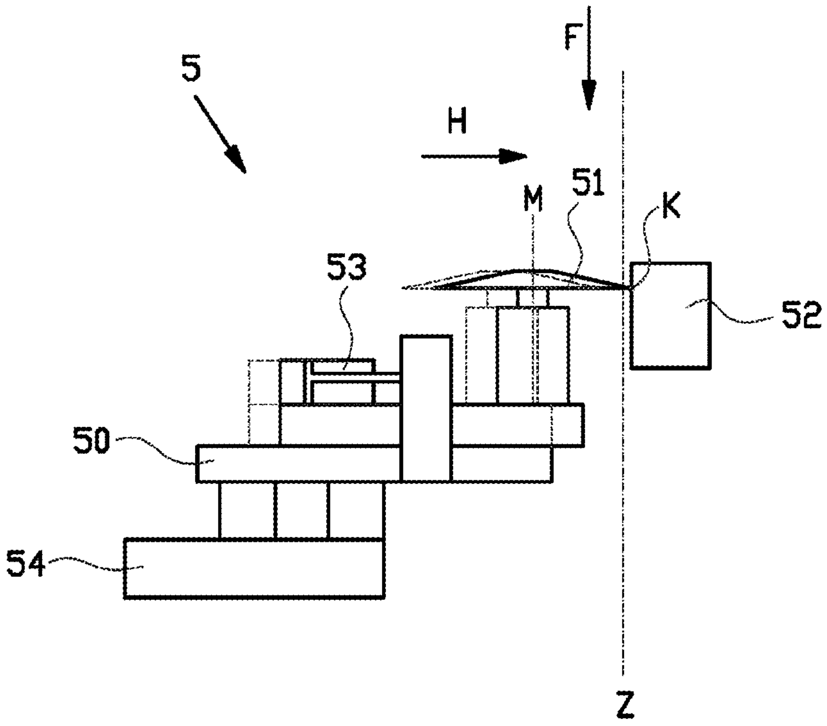
Figure 6:
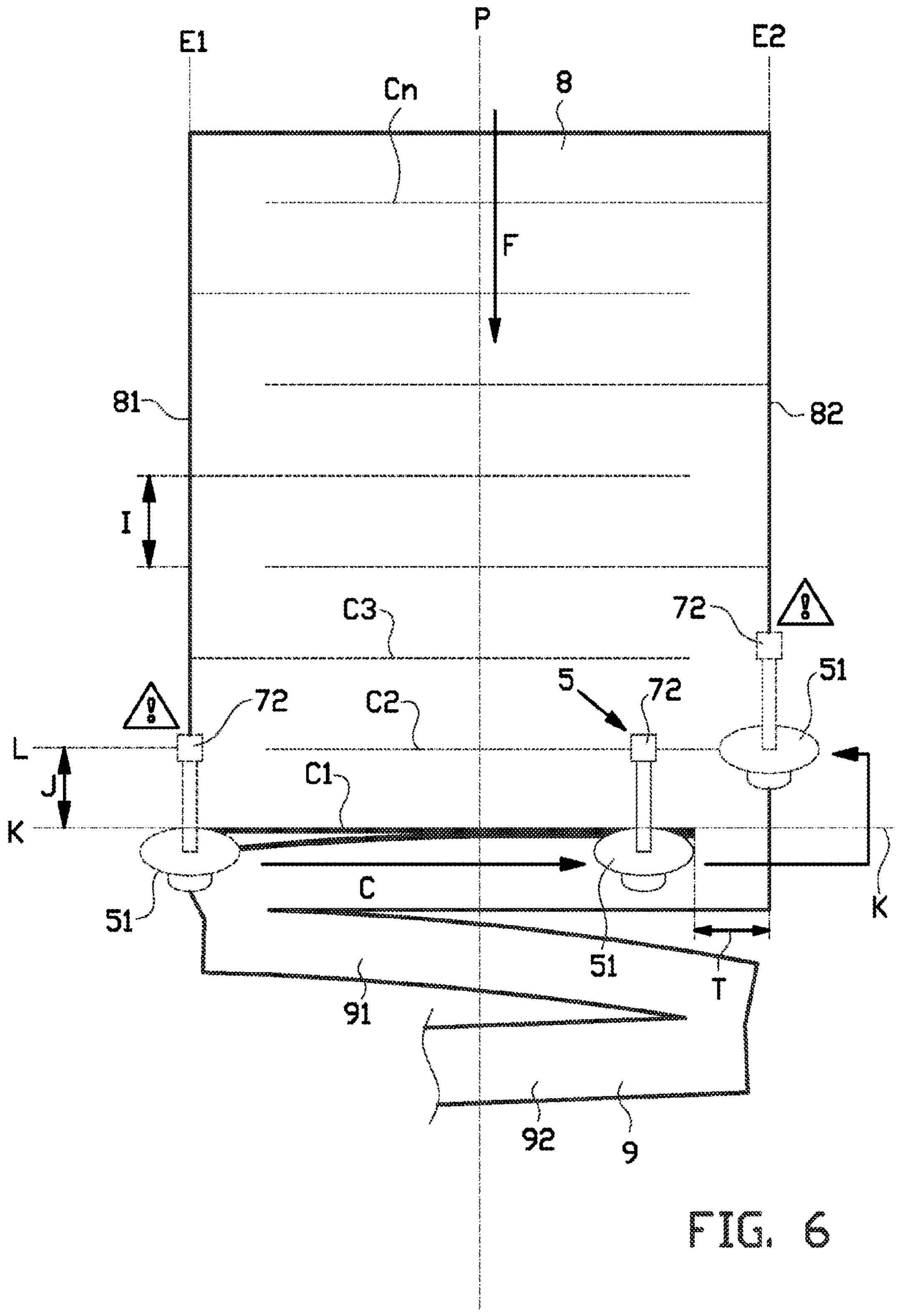
FIG. 6 shows a front view of the cutting section according to FIG. 1.

FIGS. 5A and 5B show the cutting section 5 in more detail. The cutting section 5 comprises a cutting member 51 for cutting the sheet 8 in a cutting direction C along a cutting line K, as shown in FIG. 6, intersecting with the feeding path P. In this example, as shown in FIG. 5A, the cutting member 51 is a cutting disc that is rotatable about a cutter axis M parallel to the feeding path P, the feeding plane Z and/or the feeding direction F at said cutting line K. The cutting section 5 further comprises a carriage 50 for carrying the cutting member 51 relative to the cutting line K and a cutting drive 54 for driving or moving said carriage 50 in the cutting direction C along the cutting line K.

The cutting section 5 is provided with an anvil 52 that cooperates with the cutting member 51 for cutting the sheet 8 along the cutting line K. The anvil 52 is located opposite to the cutting member 51 with respect to the feeding path P and/or the feeding plane Z. As shown by comparing FIGS. 5A and 5B, the cutting member 51 is movable into abutment with the anvil 52 in an incision direction H perpendicular to the feeding path P, the feeding plane Z and/or the cutting line K. The cutting section 5 is further provided with a dampener 53 for absorbing, dampening and/or cushioning impacts between the cutting member 51 and the anvil 52 in said incision direction H. In particular, the cutting 5 member 51 is movable along an incision stroke in the incision direction H, wherein the dampener 53 is configured for cushioning the impact at the end of the incision stroke.

As further shown in FIGS. 5A and 5B, the feeding plane Z, at the intersection between the feeding path P and the cutting line K, is vertical or substantially vertical, i.e. within a range of zero to ten degrees to a vertical plane.

As shown in FIG. 1, the outfeed section 6 is provided with an outfeed opening 61 in the housing of the apparatus 1 for feeding out the continuous strip 9 from the apparatus 1. Because of the vertical or nearly vertical orientation of the feeding plane Z at the cutting section 5, the leading end of the continuous strip 9 tends to drop down onto the floor of the apparatus 1. Hence, when starting the cutting operation and upon creation of a new leading end at the continuous strip 9, said leading end has to be guided towards and through the outfeed opening 61. Since it may be difficult or hazardous to reach into the apparatus 1 when it is in operation, the outfeed section 6 is further provided with a deflection member 62 for deflecting the continuous strip 9 towards the outfeed opening 61. In this example, the deflection member 62 comprises a manually operable lever 63. Said manually operable lever 63 may be arranged at a safely accessible position outside of the housing of the apparatus 1.

As shown in FIG. 1, the apparatus 1 further comprises an irregularity sensor 71 for detecting a parameter indicative of a position and/or orientation of the one or more input rollers 21 or the one or more swing arms 22 relative to the feeding path P. In particular, the irregularity sensor 71 may be a photocell for sensing a light beam that extends over the one or more input rollers 21 and/or the one or more swing arms 22 when the one or more input rollers 21 are in a normal position. However, when the one or more input rollers 21 are displaced by an irregularity in the sheet 8 in an upward direction, said one or more input rollers 21 or the one or more swing arms 22 associated therewith interrupt the light beam, which interruption can be used as an indication that an irregularity has passed the position of the one or more input rollers 21. The irregularity sensor 71 is operationally, electronically and/or functionally connected to the control unit 7. The control unit 7, upon receipt of a signal from the irregularity sensor 71, can stop the apparatus 1 and request human intervention.

The irregularity sensor 71 may alternatively be arranged further downstream of the one or more input rollers 21, for example at a predetermined height above the conveyor belt 32 to detect irregularities directly at the sheet 8 or at the pressing member 23 for detecting irregularities as a function of the height of said pressing member 23. The irregularity sensor 71 is located upstream of the second infeed member 4 to prevent that an irregularity exceeding a predetermined threshold gets stuck in the pair of calendering rolls 41, 42.

As shown in FIG. 6, the longitudinal edges 81, 82 of the sheet 8 may have a slightly irregular shape. Hence, lateral positions E1, E2 of the respective longitudinal edges 81, 82 may vary slightly for each cut C1, C2, C3, . . . , Cn in the sequence of cuts C1, C2, C3, . . . , Cn. The apparatus 1 is provided with an lateral edge sensor 72 for detecting the lateral positions E1, E2 of the longitudinal edges 81, 82. Said detected lateral positions E1, E2 can be used to determine an appropriate start, end, cutting length and/or termination length T such that the respective cuts C1, C2, C3, . . . , Cn in the sequence of cuts C1, C2, C3, . . . , Cn can be terminated short of the respective longitudinal edges 81, 82.

The lateral edge sensor 72 is located at a detection position L upstream of the cutting line K with respect to the feeding direction F. In particular, the apparatus 1 is configured for providing the cuts C1, C2, C3, . . . , Cn in the sequence at a cutting interval I. In other words, the sheet 8 is advanced between cuts C1, C2, C3, . . . , Cn over a distance in the feeding direction F equal to the cutting interval I. The detection position L is upstream of the cutting line K at a detection distance J from said cutting line K that is equal to said cutting interval I. Alternatively, the detection distance J may be greater than said cutting interval I, preferably a multiple of said cutting interval I.

In this particular example, the lateral edge sensor 72 is arranged to move with the cutting member 51 in the cutting direction C. More specifically, the lateral edge sensor 72 is mounted to or carried by the same carriage 50 carrying the cutting member 51. The lateral edge sensor 72 is centered with respect to the cutting member 51 in the cutting direction C. In other words, the lateral edge sensor 72 is symmetrically arranged relative to the cutting member 51 in the cutting direction C. Hence, the lateral edge sensor 72 can detect the longitudinal edges 81, 82 at both sides of the sheet 8 in substantially the same manner.

The lateral edge sensor 72 is operationally, electronically and/or functionally connected to the control unit 7 for sending a signal indicative of the edge position E1, E2 of the respective longitudinal edges 81, 82 to said control unit 7. The control unit 7 is configured for associating the signal received from the lateral edge sensor 72 during one of the cuts C1, C2, C3, . . . , Cn of the sequence of cuts C1, C2, C3, . . . , Cn with a future cut C2 of the sequence of cuts C1, C2, C3, . . . , Cn still to be made. The signal or a value indicative of said signal may for example be stored in a memory, in particular a non-transitory memory, for later use. The control unit 7 is further configured for setting the termination distance T for said future cut C2 based on the signal from the lateral edge sensor 72.

As shown in FIG. 1, the apparatus 1 further comprises a first leading edge sensor 73 for detecting when the leading end of the continuous strip 9 passes the location of the first leading edge sensor 73. In this example, the first leading edge sensor 73 is located in the infeed section 2, in particular between the one or more input rollers 21 and the pressing member 23. Alternatively, the functionality of the first leading edge sensor 73 may also be integrated into the one or more input rollers 21 or the pressing member 23. The first leading edge sensor 73 is operationally, functionally and/or electronically connected to the control unit 7 for sending a signal indicative of the detection of the leading end to said control unit 7. In this example, the first leading edge sensor 73 comprises a detection roller 74 for rolling over the continuous strip 9. When the leading end arrives at the detection roller 74, it is lifted from the surface of the conveyor belt 32, which lifting is detected as an indication of the arrival of the leading end.

The control unit 7 may further receive signals from an encoder to track how much of the length of the continuous strip 9 has passed the location of the first leading edge sensor 73, in order to determine when the leading end theoretically arrives at the cutting section 5. In this example, the encoder is coupled to the detection roller 74 for sensing the rotation of said detection roller 74. This has the additional technical advantage that the length of the continuous strip 9 that passes can be measured more accurately compared to an encoder associated with the conveyor belt 3, in particular because the detection roller 74 also rolls over waves, wrinkles or folds in the continuous strip 9 and thus includes the length of the continuous strip 9 in waves, wrinkles or folds in its measurements.

Note that a second leading end sensor 75 may be provided at the cutting section 5, for example at, in or opposite to the anvil 52, to detect whether the leading end has actually arrived at the cutting section 5 as expected. In particular, the second leading end sensor 75 detects whether the continuous strip 9 is present at or downstream of the cutting line K. The leading end may fail to pass the cutting line K when the continuous strip 9 has folds or wrinkles that cause it to deflect from its feeding path P. When the leading end is not detected when it theoretically should have arrived at the cutting section 5, it is assumed that something went wrong and the apparatus 1 is stopped.

Figure 7:
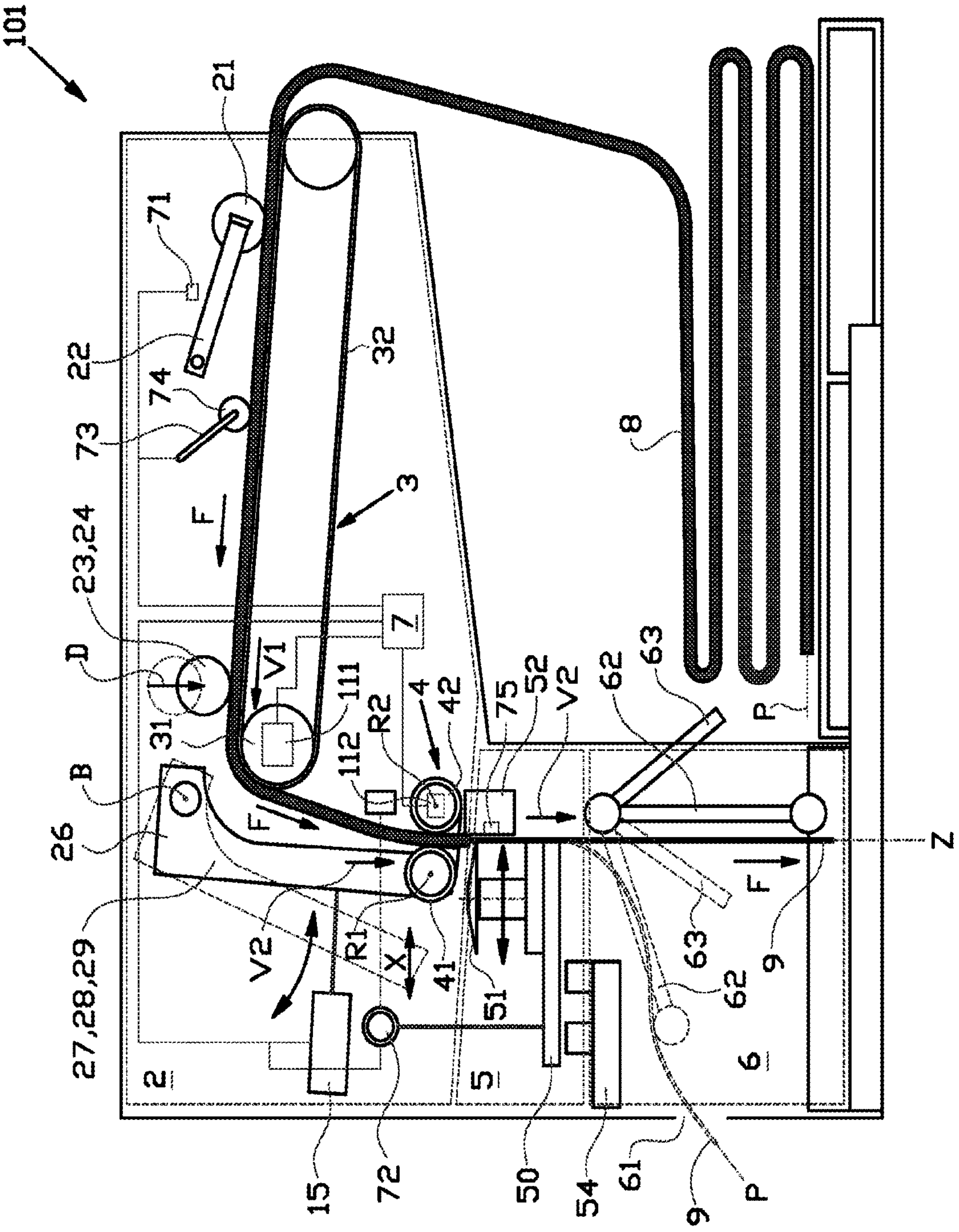
FIG. 7 shows a side view of an alternative apparatus for converting a sheet into a continuous strip according to a second exemplary embodiment of the invention

FIG. 7 shows an alternative apparatus 101 according to a second exemplary embodiment of the invention, which differs from the previously discussed apparatus 1 only in that the transmission 12 is replaced by a second drive 112 that is controlled by the control unit 7 in relation to the first drive 111 such that the second infeed rate V2 is higher than the first infeed rate V1. By providing to individual drives 111, 112, the ratio between the first infeed rate V1 and the second infeed rate V2 can be adjusted or varied depending on the requirements.

A method for converting the sheet 8 of elastomeric material into the continuous strip 9 using the aforementioned apparatuses 1, 101 will now be briefly discussed with reference to FIGS. 1-4, 5A, 5B and 6.

As shown in FIGS. 1 and 2, the sheet 8 is fed along the feeding path P with the first infeed member 3 imposing the first infeed rate V1 onto the sheet 8 and with the second infeed member 4 imposing the second infeed rate V2 onto the sheet 8. By providing a speed difference between the first infeed rate V1 and the second infeed rate V2, the sheet 8 is stretched between the first infeed member 3 and the second infeed member 4. The stretching can reduce, flatten or smooth out irregularities, such as folds or creases, in the sheet 8. Hence, the risk of blockage and/or clogging of the apparatus 1, 101 as a result of such irregularities can be reduced.

As shown in FIGS. 5A and 5B, the cutting member 51 is moved back and forth in the incision direction H to form the sequence of cuts C1, C2, C3, . . . , Cn as best seen in FIG. 6. In particular, as shown in FIG. 6, the cutting member 51 is positioned outside of the sheet 8 alongside the first longitudinal edges 81 to start the first cut C1 by cutting into the sheet 8 through said first longitudinal edge 81. When reaching the termination distance T, the cutting member 51 is pulled back in a direction opposite to the incision direction H to prevent that the cutting member 51 cuts any further into the sheet 8 beyond said termination distance T. Hence, the first zig-zag section 91 formed by said first cut C1 remains connected to the sheet 8 and any future zig-zag sections 92-94 to be cut.

Note that when the cutting member 51 start the first cut C1, the lateral edge sensor 72 has already detected the lateral position E1 of the first longitudinal edge 81 at the detection position L upstream of the cutting line K. In particular, said lateral position E1 is detected at a position where the future second cut C2 of the sequence of cuts C1, C2, C3, . . . , Cn will be made after completing the first cut C1. The lateral position E1 is used to calculator determine the termination distance T or a parameter associated with said termination distance T for the second cut C2. Similarly, note that when starting the second cut C2 at the second longitudinal edge 82, the lateral edge sensor 72 can already detect the lateral position E2 of the second longitudinal edge 82 for the purpose of determining or calculating the termination distance T or a parameter associated with said termination distance T of the future third cut C3 of the sequence of cuts C1, C2, C3, . . . , Cn. This process can be repeated for all cuts C1, C2, C3, . . . , Cn in the sequence.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

LIST OF REFERENCE NUMERALS

1 apparatus
11 first drive
12 transmission
2 infeed section
21 input roller
22 swing arm
23 pressing member
24 pressing roll
25 actuator
26 holder
27 first infeed guide
28 second infeed guide
29 third infeed guide
3 first infeed member
31 first driven roll
32 conveyor belt
4 second infeed member
40 shaft
41 first calendering roll
42 second calendering roll/second driven roll
43 first disc
44 first guide body
45 first guide surface
46 second disc
47 second guide body
48 second guide surface
5 cutting section
50 carriage
51 cutting member
52 anvil
53 dampener
54 cutting drive
6 outfeed section
61 outfeed opening
62 deflection member
63 lever
7 control unit
71 irregularity sensor
72 lateral edge sensor
73 first leading end sensor
74 detection roller
75 second leading end sensor
8 sheet
81 first longitudinal side
82 second longitudinal side
9 continuous strip
101 alternative apparatus
111 first drive
112 second drive
A axial direction
B pivot axis
C cutting direction
C1 first cut
C2 second cut
C3 third cut
Cn n-th cut
D pressing direction
E1 lateral position
E2 lateral position
F feeding direction
guide area G
H incision direction
I cutting interval
J detection distance
K cutting line
L detection position
M cutter axis
N1 ingoing nip
N2 outgoing nip P feeding path
Q quadrant
R1 first roll axis
R2 second roll axis
S square area
T termination distance
V1 first infeed rate
V2 second infeed rate
W1 disc width
W2 guide body width
Z feeding plane

The invention claimed is:

1. An apparatus for converting a sheet of elastomeric material into a continuous strip, wherein the apparatus comprises a cutting section for providing a sequence of cuts in the sheet along which the sheet is separable into interconnected zig-zag sections to form the continuous strip, wherein the apparatus further comprises an infeed section for feeding the sheet to the cutting section in a feeding direction along a feeding path, wherein the infeed section comprises a first infeed member for feeding the sheet along the feeding path at a first infeed rate, and a second infeed member downstream of said first infeed member for feeding the sheet along the feeding path at a second infeed rate, wherein the apparatus is operable in a stretching mode in which the second infeed rate is higher than the first infeed rate, wherein the apparatus comprises:

a first drive for driving one of the first infeed member and the second infeed member, wherein the apparatus further comprises a transmission between the first infeed member and the second infeed member for driving the other of the first infeed member and the second infeed member in a transmission ratio in which the second infeed rate is higher than the first infeed rate; or a first drive for driving the first infeed member, a second drive for driving the second infeed member and a control unit that is operationally connected to the first drive and the second drive to control that the second infeed rate is higher than the first infeed rate in the stretching mode.

2. The apparatus according to claim 1, wherein the first infeed member comprises a first driven roll and a first drive for rotating the first driven roll, wherein the apparatus comprises a control unit that is operationally connected to the first drive to rotate the first driven roll at a circumferential speed corresponding to the first infeed rate in the stretching mode.

3. The apparatus according to claim 2, wherein the first infeed member comprises a conveyor belt for conveying the sheet along the feeding path, wherein the first driven roll is arranged for driving the conveyor belt.

4. The apparatus according to claim 3, wherein the apparatus further comprises a pressing member for pressing the sheet on the conveyor belt in a pressing direction.

5. The apparatus according to claim 4, wherein the pressing direction is vertical and wherein the pressing member is freely movable under the influence of gravity in said pressing direction.

6. The apparatus according to claim 4, wherein the pressing member comprises a pressing roll.

7. The apparatus according to claim 1, wherein the second infeed member comprises a second driven roll, wherein the second driven roll is arranged to be rotated in the stretching mode at a circumferential speed corresponding to the second infeed rate.

8. The apparatus according to claim 1, wherein the second infeed member comprises a pair of calendering rolls that defines an ingoing nip for receiving the sheet in the feeding direction and an outgoing nip for feeding the sheet further in the feeding direction along the feeding path.

9. The apparatus according to claim 8, wherein at least one calendering roll of the pair of calendering rolls is driven.

10. The apparatus according to claim 8, wherein one calendering roll of the pair of calendering rolls is rotatable about a first roll axis and is movable towards and away from the other calendering roll of the pair of calendering rolls in a calendering direction perpendicular to the first roll axis.

11. The apparatus according to claim 10, wherein the apparatus comprises an actuator for pressing said one calendering roll in the calendering direction towards the other calendering roll.

12. The apparatus according to claim 11, wherein the actuator is further arranged for moving said one calendering roll away from the other calendering roll.

13. The apparatus according to claim 8, wherein the pair of calendering rolls comprises a first calendering roll with a plurality of first discs positioned coaxially to and rotatable about a first roll axis, wherein the second infeed member comprises one or more first guide bodies interposed between the plurality of first discs in an axial direction parallel to said first roll axis, wherein the one or more first guide bodies protrude into a guide area downstream of the outgoing nip of the pair of calendering rolls.

14. The apparatus according to claim 13, wherein the one or more first guide bodies protrude beyond the plurality of first discs into a square area containing a quadrant of the plurality of first discs, wherein said square area extends up to the feeding path and is located downstream of the first roll axis.

15. The apparatus according to claim 13, wherein each first guide body of the one or more first guide bodies is provided with a first guide surface for guiding the sheet along the feeding path downstream of the first calendering roll.

16. The apparatus according to claim 15, wherein the first guide surface diverges from the feeding path considered in the feeding direction.

17. The apparatus according to claim 13, wherein the one or more first guide bodies comprises a plurality of first guide bodies, wherein the plurality of first guide bodies are alternated with the plurality of first discs in the axial direction.

18. The apparatus according to claim 13, wherein each first disc of the plurality of first discs has a disc width in the axial direction, wherein each first guide body of the one or more first guide bodies has a guide body width in the axial direction that is smaller than the disc width.

19. The apparatus according to claim 13, wherein the one or more first guide bodies, at the ingoing nip, are recessed with respect to the plurality of first discs.

20. The apparatus according to claim 13, wherein the one or more first guide bodies are fixed about the first roll axis.

21. The apparatus according to claim 13, wherein the apparatus comprises a holder for holding the first calendering roll and the one or more first guide bodies, wherein the holder is movable in a calendering direction perpendicular to the first roll axis.

22. The apparatus according to claim 13, wherein the pair of calendering rolls comprises a second calendering roll with a plurality of second discs positioned coaxially to and rotatable about a second roll axis parallel to the first roll axis, wherein the second infeed member comprises one or more second guide bodies interposed between the plurality of second discs in the axial direction, wherein the one or more second guide bodies protrude beyond the plurality of second discs towards the feeding path downstream of the second calendering roll.

23. The apparatus according to claim 22, wherein each first guide body of the one or more first guide bodies is opposite to a respective second guide body of the one or more second guide bodies in a calendering direction perpendicular to the first roll axis.

24. The apparatus according to claim 22, wherein each first guide body of the one or more first guide bodies is provided with a first guide surface for guiding the sheet along the feeding path downstream of the pair of calendering rolls, wherein each second guide body of the one or more second guide bodies is provided with a second guide surface for guiding the sheet along the feeding path downstream of the pair of calendering rolls, wherein the first guide surface diverges from the second guide surface considered in the feeding direction.

25. The apparatus according to claim 1, wherein the apparatus further comprises an sensor for detecting irregularities in the sheet upstream of the second infeed member.

26. The apparatus according to claim 1, wherein the infeed section further comprises one or more input rollers for retaining the sheet in the apparatus, wherein the one or more input rollers are rotatable in one-way only.

27. The apparatus according to claim 26, wherein the infeed section comprises one or more swing arms for supporting the one or more input rollers relative to the feeding path and an irregularity sensor for detecting a parameter indicative of a position or orientation of the one or more input rollers or the one or more swing arms relative to the feeding path.

28. The apparatus according to claim 1, wherein the sheet has two longitudinal edges, wherein the cuts in the sequence alternately extend from one of the longitudinal edges towards and terminate at a termination distance short of the other of the longitudinal edges to form the plurality of interconnected zig-zag sections, wherein the cutting section comprises a cutting member for cutting the sheet along a cutting line intersecting with the feeding path and an lateral edge sensor for detecting lateral positions of the longitudinal edges at a detection position upstream of the cutting line with respect to the feeding direction.

29. The apparatus according to claim 28, wherein the apparatus is configured for providing the cuts in the sequence at a cutting interval, wherein the detection position is upstream of the cutting line at a detection distance from said cutting line that is equal to or greater than said cutting interval.

30. The apparatus according to claim 28, wherein the lateral edge sensor is arranged to move with the cutting member in a cutting direction parallel to the cutting line.

31. The apparatus according to claim 30, wherein the lateral edge sensor is centered with respect to the cutting member in the cutting direction.

32. The apparatus according to claim 28, wherein the apparatus further comprises a control unit that is operationally connected to the lateral edge sensor for receiving a signal indicative of an edge position of one of the longitudinal edges in the detection position, wherein the control unit is configured for associating the signal received from the lateral edge sensor during one of the cuts of the sequence of cuts with a future cut of the sequence of cuts still to be made.

33. The apparatus according to claim 32, wherein the control unit is configured for setting the termination distance for said future cut based on the signal from the lateral edge sensor.

34. A method for converting a sheet of elastomeric material into a continuous strip using the apparatus according to claim 1, wherein the method comprises the steps of:

feeding the sheet along the feeding path with the first infeed member at the first infeed rate; and feeding the sheet along the feeding path with the second infeed member at the second infeed rate.

35. The method according to claim 34, wherein the sheet has two longitudinal edges, wherein the cuts in the sequence alternately extend from one of the longitudinal edges towards and terminate at a termination distance short of the other of the longitudinal edges to form the plurality of interconnected zig-zag sections, wherein the cutting section comprises a cutting member for cutting the sheet along a cutting line intersecting with the feeding path, wherein the method further comprises the step of detecting lateral positions of the longitudinal edges at a detection position upstream of the cutting line with respect to the feeding direction.

36. The method according to claim 35, wherein the cuts in the sequence are provided at a cutting interval, wherein the detection position is upstream of the cutting line at a detection distance from said cutting line that is equal to or greater than said cutting interval.

37. The method according to claim 35, wherein the method further comprises the step of associating a lateral position of a longitudinal edge detected at the detection position during one of the cuts of the sequence of cuts with a future cut of the sequence of cuts still to be made.

38. The method according to claim 37, wherein the method further comprises the step of setting the termination distance for said future cut based on the lateral position of the longitudinal edge associated with said future cut.

39. The apparatus according to claim 1, wherein the control unit of both drives allows for setting or adjusting a variable ratio between the first infeed rate and the second infeed rate during the stretching mode, or for alternatively switching to a non-stretching mode in which the infeed rates are equal.

* * * * *